United States Patent
Iacono et al.

(10) Patent No.: US 7,680,518 B2
(45) Date of Patent: Mar. 16, 2010

(54) DEVIATION BASED ANTENNA CONTROL ALGORITHM FOR AN ACCESS POINT

(75) Inventors: Ana Lucia Iacono, West Chester, PA (US); Kai Liu, Melville, NY (US); Daniel Steinbach, Commack, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 87 days.

(21) Appl. No.: 11/691,062

(22) Filed: Mar. 26, 2007

(65) Prior Publication Data

US 2007/0232359 A1 Oct. 4, 2007

Related U.S. Application Data

(60) Provisional application No. 60/744,068, filed on Mar. 31, 2006.

(51) Int. Cl.
*H04M 1/00* (2006.01)

(52) U.S. Cl. ............... 455/562.1; 370/468; 370/328; 370/469; 370/259; 379/219; 379/220.01

(58) Field of Classification Search ............ 455/452.2, 455/277.2, 513, 25, 115.1, 41.2, 532.1, 562.1; 370/334, 278, 352, 353, 310, 459, 468, 338, 370/252, 280, 335, 259, 328, 401, 395.5, 370/469, 329; 379/219, 220.01
See application file for complete search history.

(56) References Cited

U.S. PATENT DOCUMENTS

| 2,474,480 | A | * | 6/1949 | Kearse | 343/803 |
| 6,075,797 | A | * | 6/2000 | Thomas | 370/468 |
| 6,661,853 | B1 | * | 12/2003 | Agami et al. | 375/340 |
| 7,009,559 | B2 | * | 3/2006 | Regnier et al. | 342/372 |
| 7,260,079 | B1 | * | 8/2007 | Chapman et al. | 370/338 |
| 7,366,464 | B2 | * | 4/2008 | Iacono et al. | 455/25 |
| 2004/0196813 | A1 | * | 10/2004 | Ofek et al. | 370/334 |
| 2004/0196834 | A1 | * | 10/2004 | Ofek et al. | 370/352 |
| 2005/0075141 | A1 | * | 4/2005 | Hoffmann et al. | 455/562.1 |
| 2005/0221837 | A1 | * | 10/2005 | Cha et al. | 455/452.2 |

* cited by examiner

*Primary Examiner*—Rafael Pérez-Gutiérrez
*Assistant Examiner*—Joseph Arevalo
(74) *Attorney, Agent, or Firm*—Allen, Dyer, Doppelt, Milbrath & Gilchrist, P.A.

(57) ABSTRACT

An access point operating in a wireless communication network includes a smart antenna for generating directional antenna beams. A method for operating the access point includes communicating with a client station using a selected directional antenna beam, with the client station initially being in a stationary position. Signal to noise ratios of signals received from the client station within a time interval are measured. At least one variation metric of a mean of the measured signal to noise ratios within the time interval is determined. This at least one determined variation metric is compared to a threshold for determining if the client station is moving.

28 Claims, 15 Drawing Sheets

DEVIATION BASED ANTENNA CONTROL ALGORITHM FOR AN ACCESS POINT

RELATED APPLICATION

This application claims the benefit of U.S. Provisional Application Ser. No. 60/744,068 filed Mar. 31, 2006, the entire contents of which are incorporated herein by reference.

FIELD OF THE INVENTION

The present invention relates to the field of wireless communications, and more particularly, to an antenna control algorithm for an access point (AP) operating with a smart antenna in an 802.11 wireless local area network (WLAN).

BACKGROUND OF THE INVENTION

Wireless local area networks (WLANs) are an alternative to or an extension of wired local area networks (LANs). An access point (AP) is a hardware device that acts as a communication hub for users of a wireless device to connect to a LAN. Access points are important for extending the physical range of services in which a wireless user has access to the LAN. Access points also affect the throughput of the networks.

Access points may operate with a subscriber based smart antenna. The smart antenna is also referred to as a switched beam antenna, and generates a plurality of antenna beams. The antenna beams generated by the smart antenna include directional antenna beams and an omni-directional antenna beam.

Wireless users are also known as client stations. Example client stations are personal computers operating with a wireless network card. The wireless network card may be compatible with the 802.11 standard, for example. An access point includes an antenna for sending forward link radio frequency signals to the client stations. The access point is also responsible for receiving reverse link radio frequency signals transmitted from each client station.

In one example, a client station is wirelessly connected to an access point within the user's house. The access point has already selected a preferred antenna beam for communicating with the client station. Because of the wireless connection, the user has the option to move from room to room within the house and still be connected to the access point. When this happens, the access point typically needs to scan the antenna beams in case a better antenna beam can be selected for communicating with the client station.

One approach to address this problem is to have two phases, a scan phase and a steady transmission phase. During the scan phase, the access point sends a "dummy" frame on each directional beam to the client station, collects received signal strength indicator (RSSI) measurements on the 802.11 ACK sent by client station, and selects the directional beam with the best RSSI.

During the steady transmission phase, the access point sends a data packet on the selected best beam, measures the ACK received on the direction beam, and measures on the uplink packets received on the omni-directional antenna beam. If the RSSI measured on the omni-directional antenna beam is better than the selected directional beam, then a scan is triggered. Alternatively, if the RSSI measured on the directional antenna beam drops, then a scan is also triggered. To check for RSSI variations, a long-term and a short-term average of RSSI values are computed.

User mobility is thus currently tracked using RSSI measurements, as well as determining when to select a new antenna beam. Computing long-term and short-term averages of the RSSI values by the access point allows determination of when the client station starts to move. It is difficult to track the client station's mobility based on an average measurement. It is also difficult to differentiate changes in the environment versus changes in the client station's position. Consequently, instead of using RSSI variations to determine when to trigger a scan due to movement of the client station, other approaches are desired.

SUMMARY OF THE INVENTION

In view of the foregoing background, it is therefore an object of the present invention to determine when an access point is to trigger a scan due to movement of the client station other than using RSSI variations.

This and other objects, features, and advantages in accordance with the present invention are provided by a method for operating an access point in an 802.11 wireless communication network communicating with at least one client station. The access point may comprise a smart antenna for generating a plurality of directional antenna beams. The method comprises communicating with a client station using a selected directional antenna beam, with the client station initially being in a stationary position, and measuring signal to noise ratios of signals received from the client station within a time interval.

The method may further comprise determining at least one variation metric of a mean of the measured signal to noise ratios within the time interval, and determining if the client station is moving by comparing the at least one determined variation metric to a threshold.

The smart antenna may further generate an omni-directional antenna beam, and the at least one determined variation metric may comprise a plurality of determined variation metrics. If the plurality of determined variation metrics is greater than the threshold over a second time interval, then the omni-directional antenna beam may be selected indicating that the client station is moving. Alternatively, if the plurality of determined variation metrics is greater than the threshold but less than the second time interval, then the selected directional antenna beam remains unchanged.

In accordance with the present invention, determining variation metrics around a mean of the signal to noise ratios provides a better way to identify client station mobility instead of relying on received signal strength indicator measurement variations. By using a measure of deviation around the mean signal to noise ratios, the long term and short term averages are not needed. Instead, by using a metric that represents a deviation around the mean signal to noise ratio, a stationary client station can be differentiated from a moving client station. This metric can be any metric that measures the variation of the signal to noise ratio, such as variance, standard deviation, or mean absolute deviation, for example.

The method may further comprise scanning the plurality of directional antenna beams if the client station has moved to a new stationary position. The threshold may be independent of the measured signal to noise ratios. The signals being measured from the client station may comprise acknowledgment messages or may comprise data packets.

To maximize the gain from using smart antenna technologies, the algorithm used in access point also has minimal overhead, quickly adapts to environmental changes, and quickly adapts to client position change (i.e., mobility).

Another aspect of the invention is directed to a method for determining which antenna beam an access point operating with a switched beam antenna needs to switch to when the current beam falls below a measured threshold. The access point operates with separate and independent rate control algorithms for each antenna beam supported by the switched beam antenna. The beam with the highest data rate for each downlink packet is selected. The access point is in a "probe phase" when the rate control algorithm for each antenna beam converges to its data rate, and is in a "constant transmission phase" after the antenna beam with best data rate has been selected.

Since the access point can only use a subset of beams over a long period, to capture the channel condition changes on other beams, downlink packets will be transmitted on the unused beams periodically to revive the rate control algorithm on these "bad beam" in order to probe the channel condition changes. Also at the time when a client station is associated with the access point, the access point transmits downlink packets on all beams for a period of time to allow rate control for each beam to converge. This phase is called the "probe phase". The rest of the time when access point selects the beam with best data rate it is called the "constant transmission phase."

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
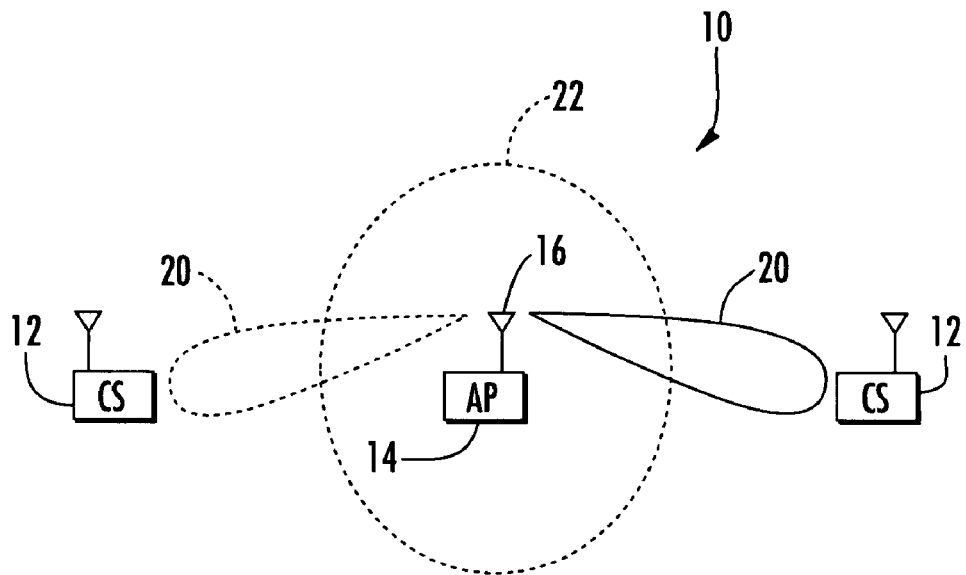
FIG. 1 is schematic diagram of an 802.11 wireless local area network (WLAN) including client stations, and an access point operating with a smart antenna in accordance with the present invention
Figure 2:
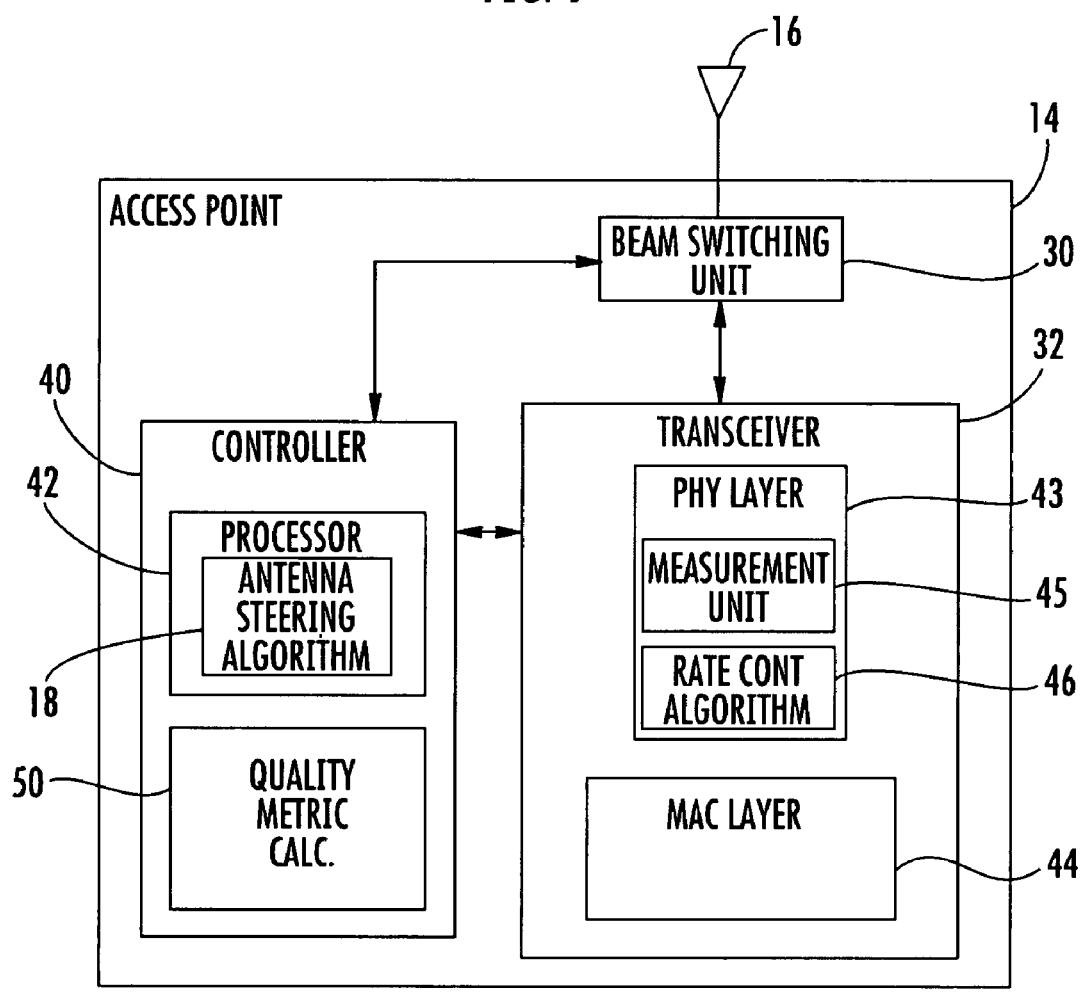
FIG. 2 is a block diagram of the access point illustrated in FIG. 1.

Referring initially to FIGS. 1 and 2, an 802.11 wireless local area network (WLAN) 10 includes client stations 12, and an access point 14 operating with a subscriber based smart antenna 16 in accordance with the present invention. The smart antenna 16, which will also be referred to as a switched beam antenna, generates a plurality of antenna beams in response to an antenna steering algorithm 18. The antenna beams generated by the smart antenna 16 include directional antenna beams 20 and an omni-directional antenna beam 22.

The access point 14 includes a beam switching unit 30 connected to the smart antenna 16, and a transceiver 32 connected to the beam switching unit. A controller 40 is connected to the transceiver 32 and to the beam switching unit 30. The controller 40 includes a processor 42 for executing the antenna steering algorithm 18. Alternatively, the antenna steering algorithm 18 may operate on an 802.11 PHY/MAC chipset instead of the illustrated processor 42. The PHY/MAC chipset includes the illustrated PHY layer 43 and the MAC layer 44. Regardless of the processor executing the antenna steering algorithm 18, the algorithm utilizes information provided by what is typically called the upper MAC or MAC management portion of the MAC software, either via MAC abstraction available for access by the external host processor 42 or on the PHY/MAC chipset.

The use of directional antenna beams 20 improves the throughput of the WLAN 10 and increases the communication range between the access point 14 and the client stations 12. A directional antenna beam 20 provides a high signal-to-noise ratio in most cases, thus allowing the link to operate at higher data rates. The PHY data rates for 802.11b links are 1, 2, 5.5, and 11 Mbps, and the rates for 802.11a are 6, 9, 12, 18, 24, 36, 48 and 54 Mbps. The 802.11g devices support the same data rates as 802.11a devices as well as the rates supported by 802.11b rates.

Even though an 802.11 WLAN is discussed with respect to the antenna steering algorithm 18, the algorithm may be adapted to other types of local area networks, as readily appreciated by those skilled in the art. Although the core logic of the algorithm will be common to an implementation on a PHY/MAC chipset or on the illustrated external host processor 42, there can be differences in performance of the antenna steering algorithm 18 depending on the type of implementation.

The client stations 12 are personal computers operating with a wireless network card, for example, and primarily use omni-directional antennas. The antenna steering algorithm 18 is resident in the access point 14 to support operation with various vendor station equipment equipped with omni-directional antennas.

The illustrated smart antenna 16 used by the access point 14 may be a delta antenna that provides six directional antenna beams 20 (i.e., N=6), plus and an omni-directional antenna beam 22. At an operating frequency of 2.44 GHz, average gain of the omni-directional antenna beam 22 is about 0.50 dBi, for example, whereas the average gain for the directional antenna beams 20 is about 5.0 dBi, for example. The smart antenna 16 may also be a trident antenna that provides two directional antenna beams 20 (i.e., N=2), plus and an omni-directional antenna beam 22.

The antenna steering algorithm 18 selects antenna beams based on computing and tracking of certain quality metrics obtained from the MAC layer management entity (MLME) and the physical layer management entity (PLME). Reference is directed to patent application Ser. No. 11/144,113 which discloses one approach for selecting antenna beams for an access point operating with a smart antenna. This patent application is hereby incorporated by reference in its entirety, and is assigned to the current assignee of the present invention. Signals received by the smart antenna 16 from the client stations 12 are measured by a measurement unit 45 in the physical layer 43. A quality metric calculator 47 in the controller 40 is for determining quality metrics based upon the measured signals.

The antenna steering algorithm 18 also includes a control portion for determining when a scan or re-scan is triggered based upon movement of the client station 12. As will be discussed in greater detail below, movement of the client station 12 is not based upon continuous movement. Instead, the client station 12 moves from one location to another and then remains stationary. At this point, a determination is made by the access point 14 as to whether a new scan needs to be performed. If a re-scan needs to be performed, then a new antenna beam is selected as discussed above using the quality metric calculator 47.

As noted above, user mobility may be tracked using RSSI measurements, as well as determining when to select a new antenna beam. Computing long-term and short-term averages of the RSSI values by the access point 14 allows determination of when the client station 12 starts to move. However, it is difficult to track mobility of the client station 12 based on an average measurement.

Figure 3:
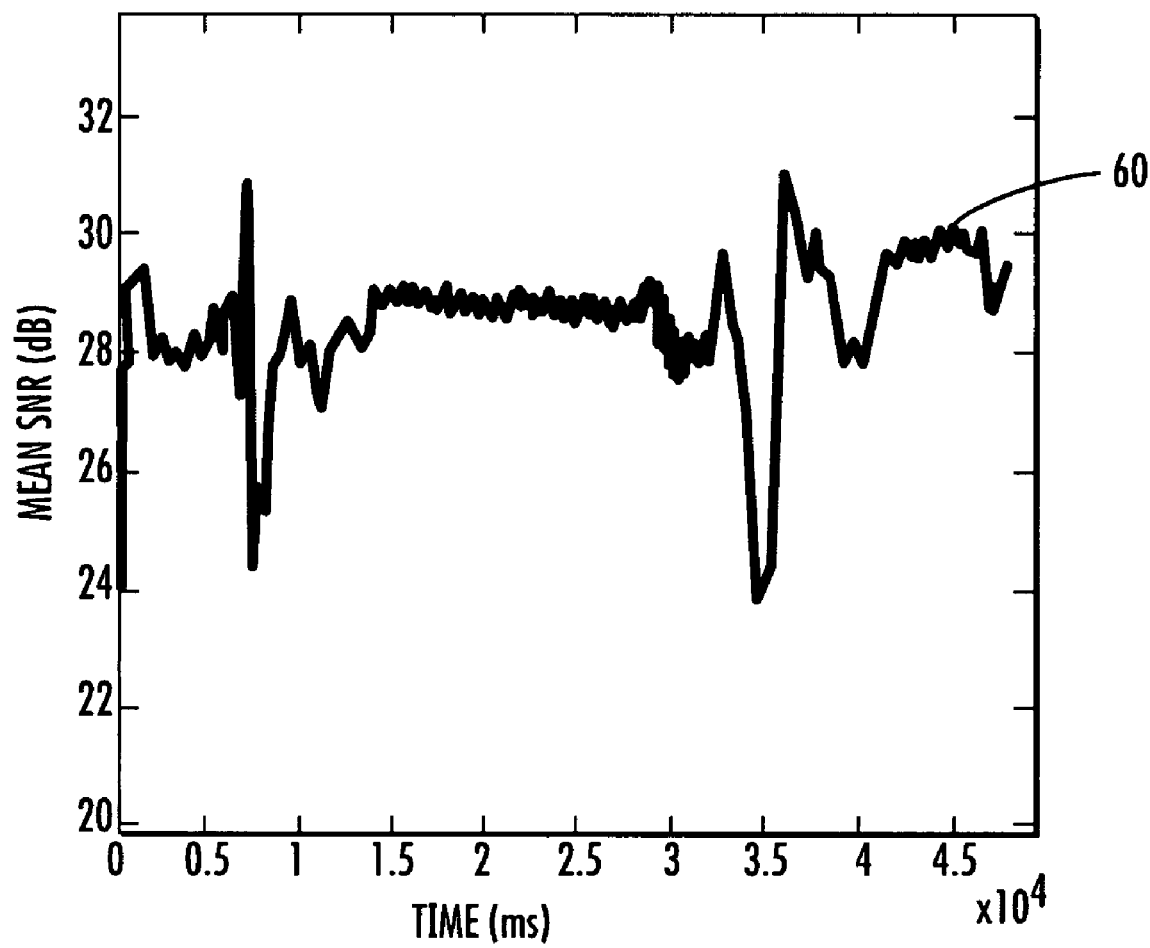
FIG. 3 is a flow chart illustrating determination by an access point of when a client station communicating therewith starts to move after being in a stationary position in accordance with the present invention.

It is also difficult to differentiate changes in the environment versus changes in the client station's position. This is shown in FIG. 3, where measurements (line 60) of the SNR were performed while the client station 12 was downloading a file. The measurements were made in the access point 14 on the acknowledgments that came back from the client station 12. The figure shows the mean SNR values. A large variation on SNR values (>20%) is observed even for a stationary user, typically due to fading.

In accordance with the present invention, measuring a deviation around the mean SNR provides a better way to identify client station 12 mobility. By using a measure of deviation around the mean SNR, the long term and short term averages are not even needed. Instead, by using a metric that represents a deviation around the mean SNR, a stationary client station 12 can be differentiated from a moving client station. This metric can be any metric that measures the variation of SNR, such as variance, standard deviation, or mean absolute deviation, for example.

Figure 4:
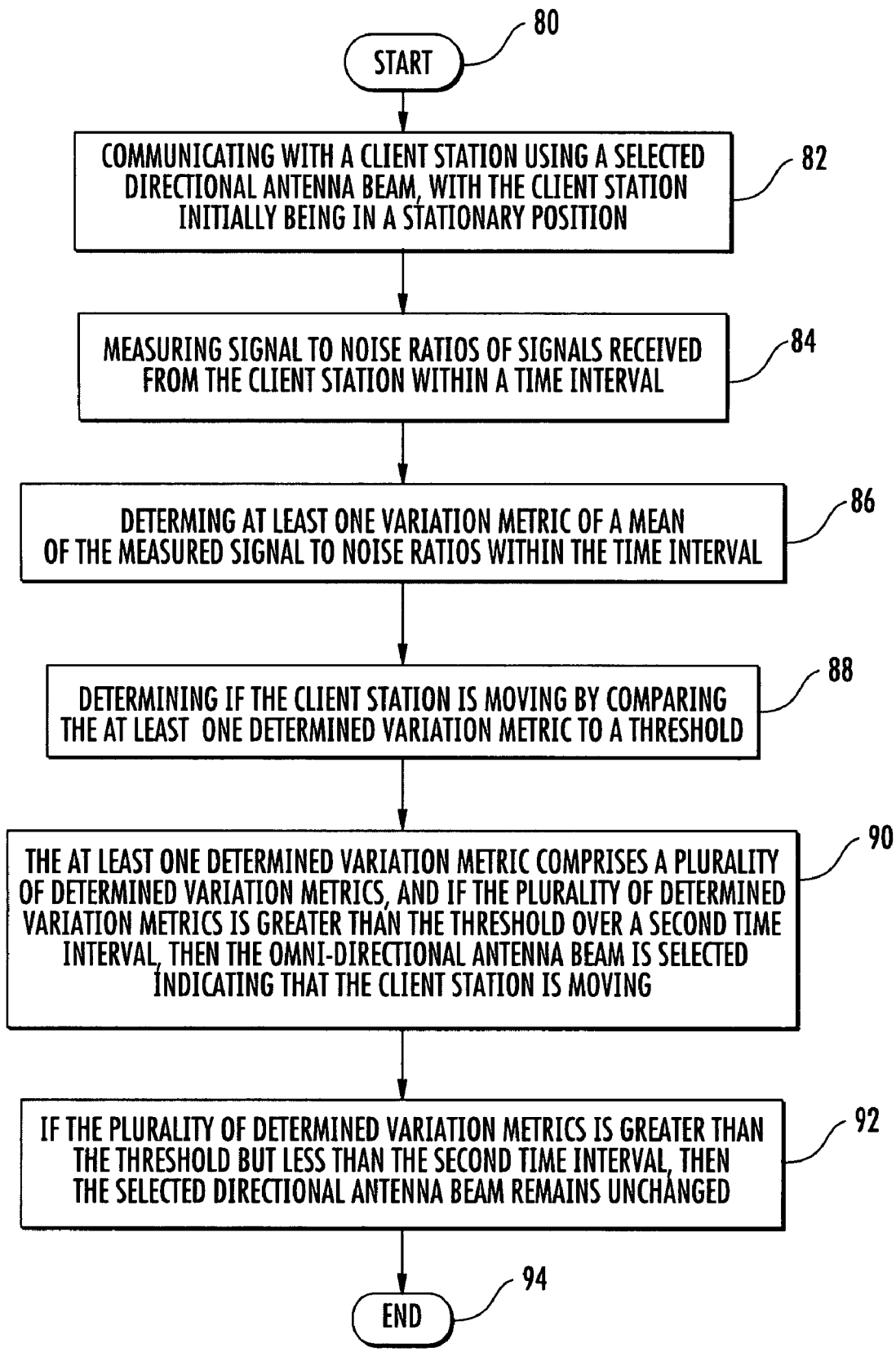
FIG. 4 is a graph of SNR versus time as measured by an access point based upon an acknowledgement signal sent for a client station to the access point while the client station remains stationary in accordance with the present invention.

A flow chart illustrating determination by the access point 14 of when a client station 12 communicating therewith starts to move after being in a stationary position will now be discussed in reference to FIG. 4. From the start (Block 80), the access point 14 is communicating with the client station 12 using a selected directional antenna beam 20, with the client station initially being in a stationary position at Block 82. The access point 14 measures signal to noise ratios of signals received from the client station within a time interval at Block 84.

At least one variation metric of a mean of the measured signal to noise ratios is determined within the time interval at Block 86. The at least one determined variation metric is compared to a threshold at Block 88 for determining if the client station 12 is moving. The at least one determined variation metric may typically comprise a plurality of determined variation metrics, and if the plurality of determined variation metrics is greater than the threshold over a second time interval, then the omni-directional antenna beam is selected indicating that the client station is moving at Block 90. However, if the plurality of determined variation metrics is greater than the threshold but less than the second time interval, then the selected directional antenna beam remains unchanged at Block 92. The method ends at Block 94.

Figure 5:
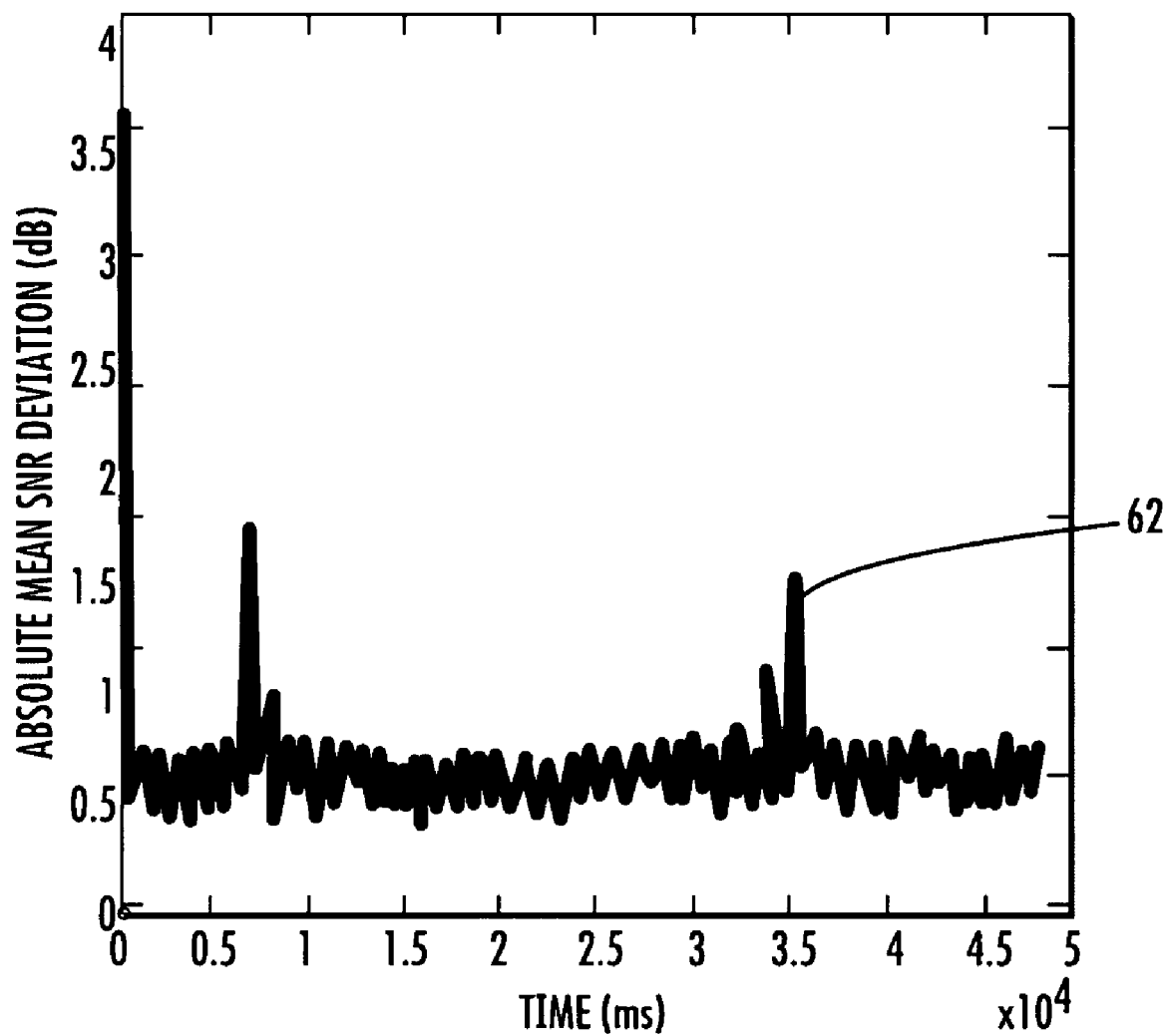
FIG. 5 is a graph of an absolute mean SNR deviation versus time as measured by an access point based upon an acknowledgement signal sent from a client station to the access point while the client station remains stationary in accordance with the present invention.

As noted above, the variation metric may be any metric that measures the variation of the SNR, such as variance, standard deviation, or mean absolute deviation. FIG. 5 shows the mean absolute deviation of the SNR values (line 62) for the case described above for a stationary user. The mean absolute deviation was calculated on the same SNR values as above, using a window of 200 ms. Even though there is a "jump" in the beginning of the transmission, the values after that "jump" always remain below 2 dB.

FIGS. 6-9 show a scenario where a test was performed using two different locations in an office area. The test was performed as follows: the client station 12 is placed in one position and the test starts. The client station 12 remains in that position for a certain period of time, and then starts walking to the next position. After arriving to the second position, the client station 12 remains in that position a certain period of time and the test ends.

Figure 6:
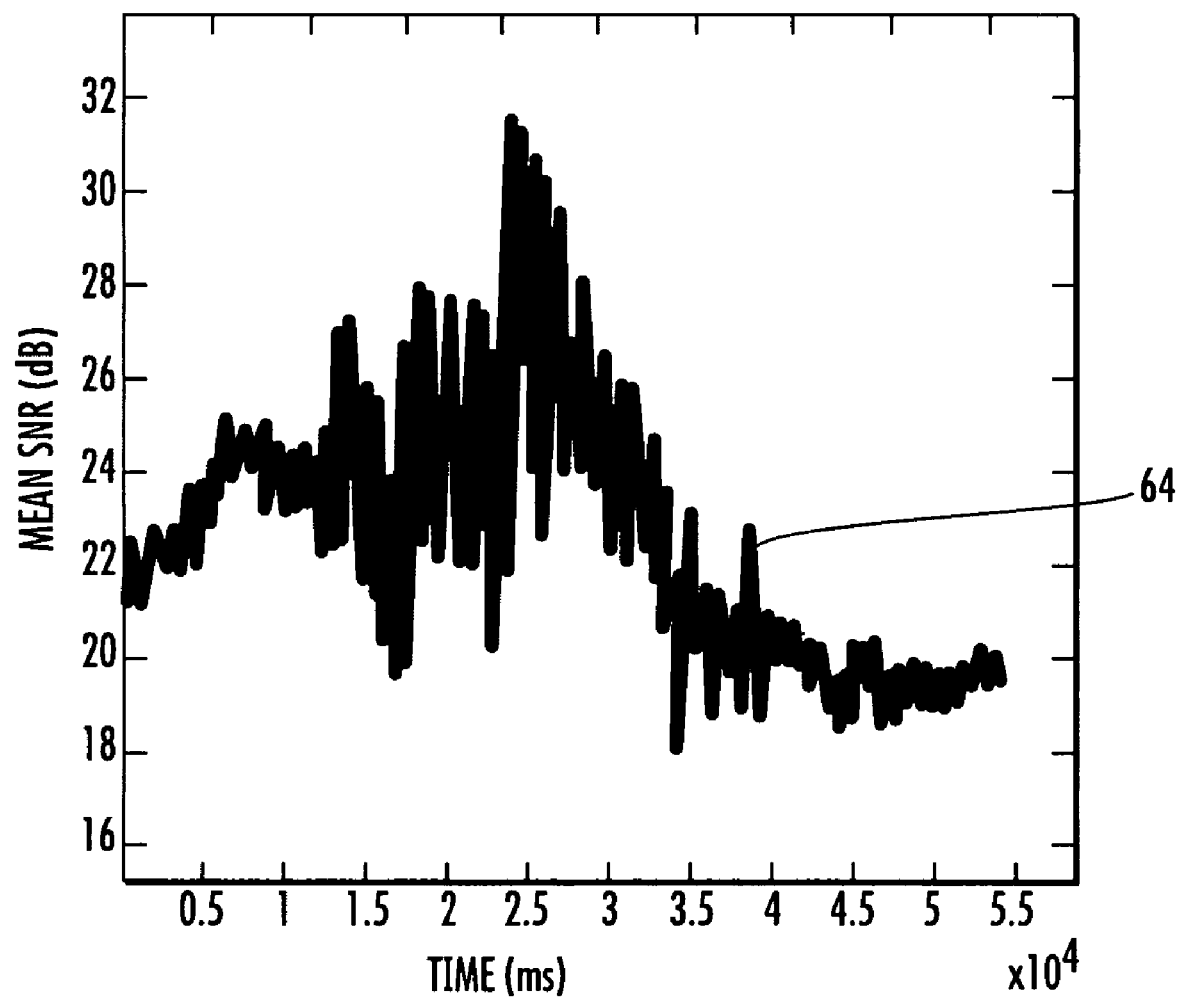
FIG. 6 is a graph of a mean SNR deviation versus time as measured by an access point based upon an acknowledgement signal sent from a client station to the access point while the client station is mobile in accordance with the present invention.
Figure 7:
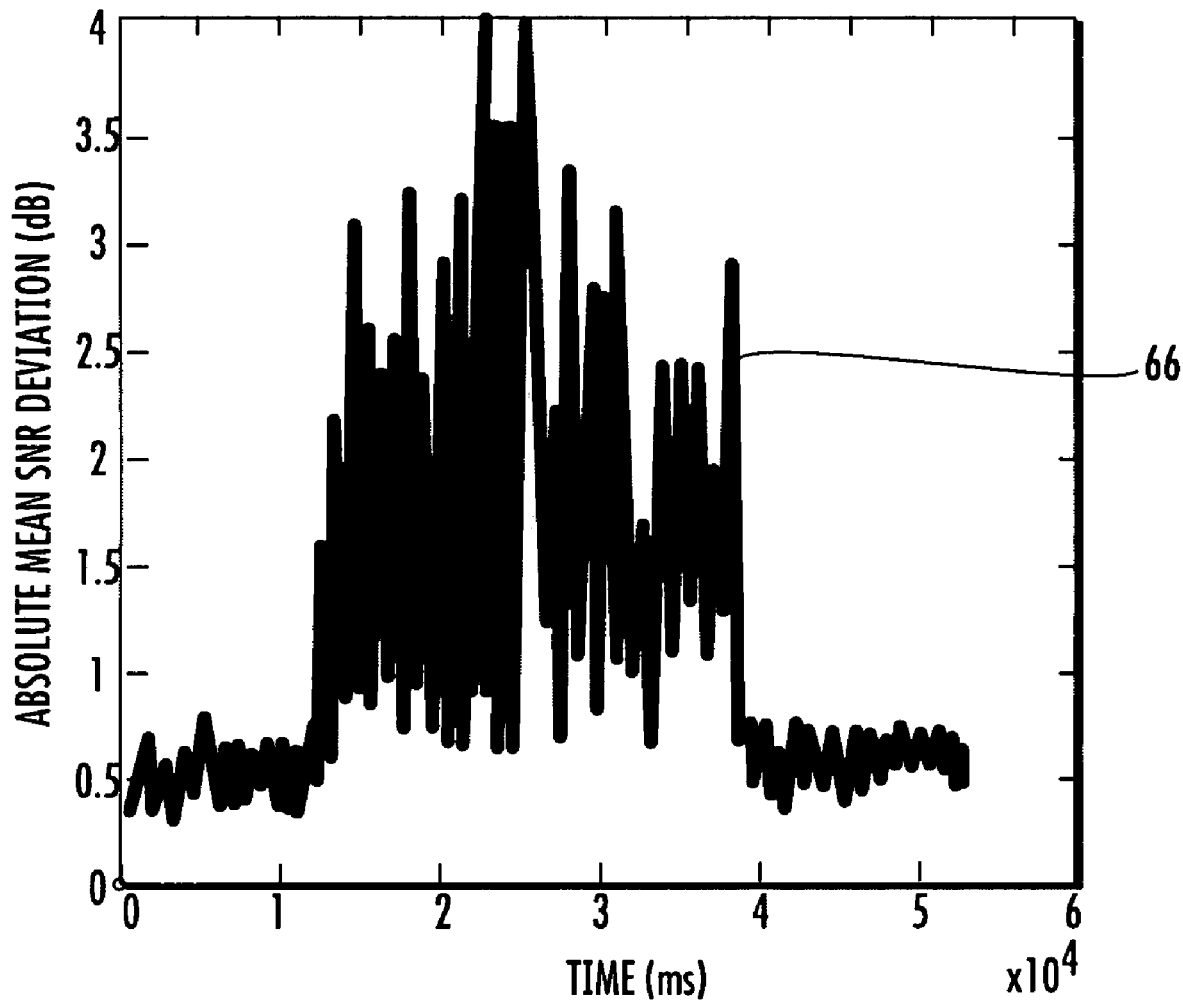
FIG. 7 is a graph of an absolute mean SNR deviation versus time as measured by an access point based upon an acknowledgement signal sent from a client station to the access point while the client station is mobile in accordance with the present invention.

During the entire time of this test the client station 12 was downloading a very large file. The access point 14 measures the SNR values on the 802.11 acknowledgements coming from the client station 12. The mean SNR (line 64) and mean absolute deviation (line 66) of the SNR values were calculated over a period of 200 ms, as shown in FIGS. 6 and 7. The graphs clearly show that the absolute deviation from the mean can be easily used to identify the times where the client station 12 was moving. These were the points in time where the deviation was above a certain threshold.

Figure 8:
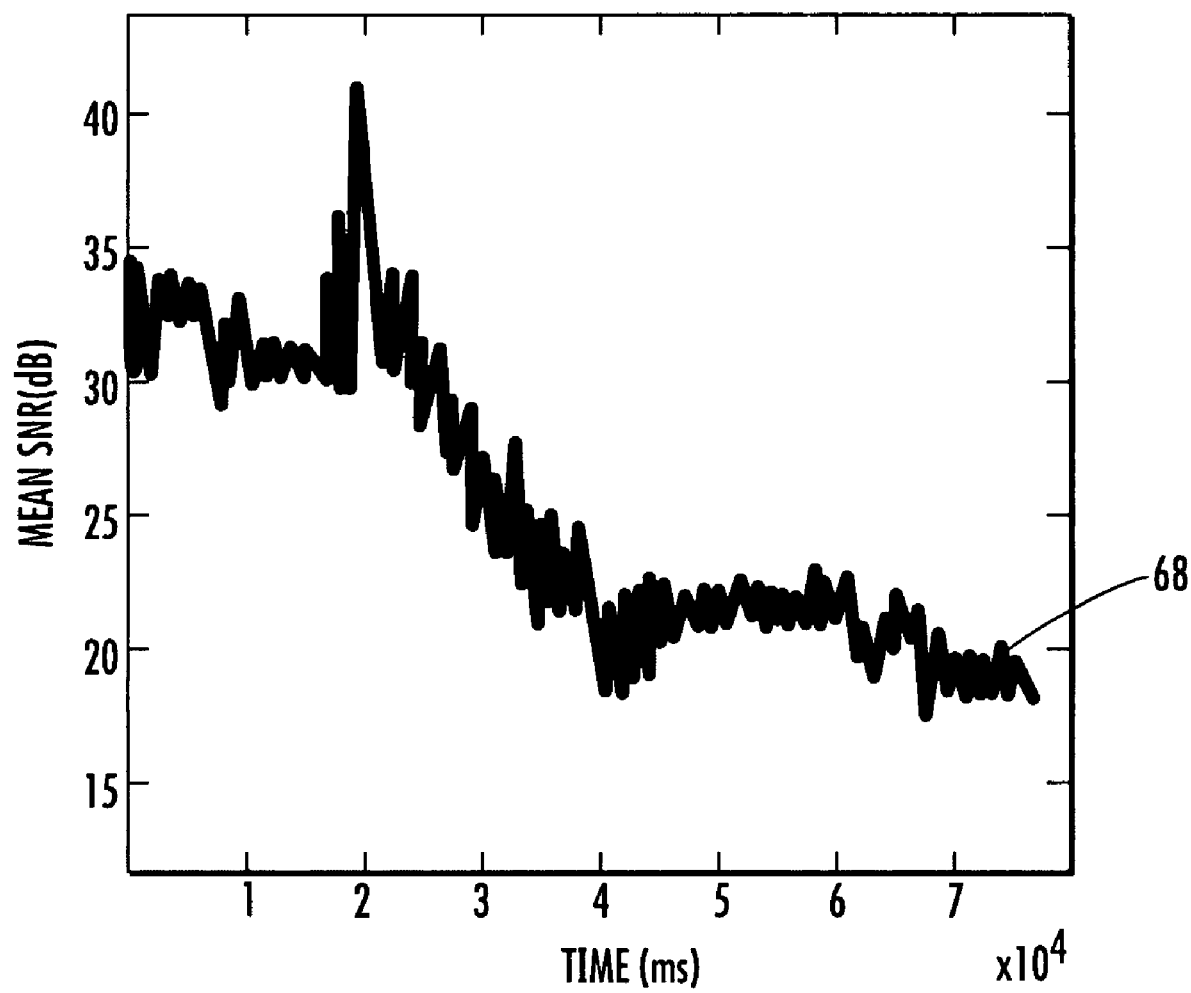
FIG. 8 is a graph of a mean SNR versus time as measured by an access point based upon an acknowledgement signal sent from a client station to the access point while the client station is moving away from the access point in accordance with the present invention.
Figure 9:
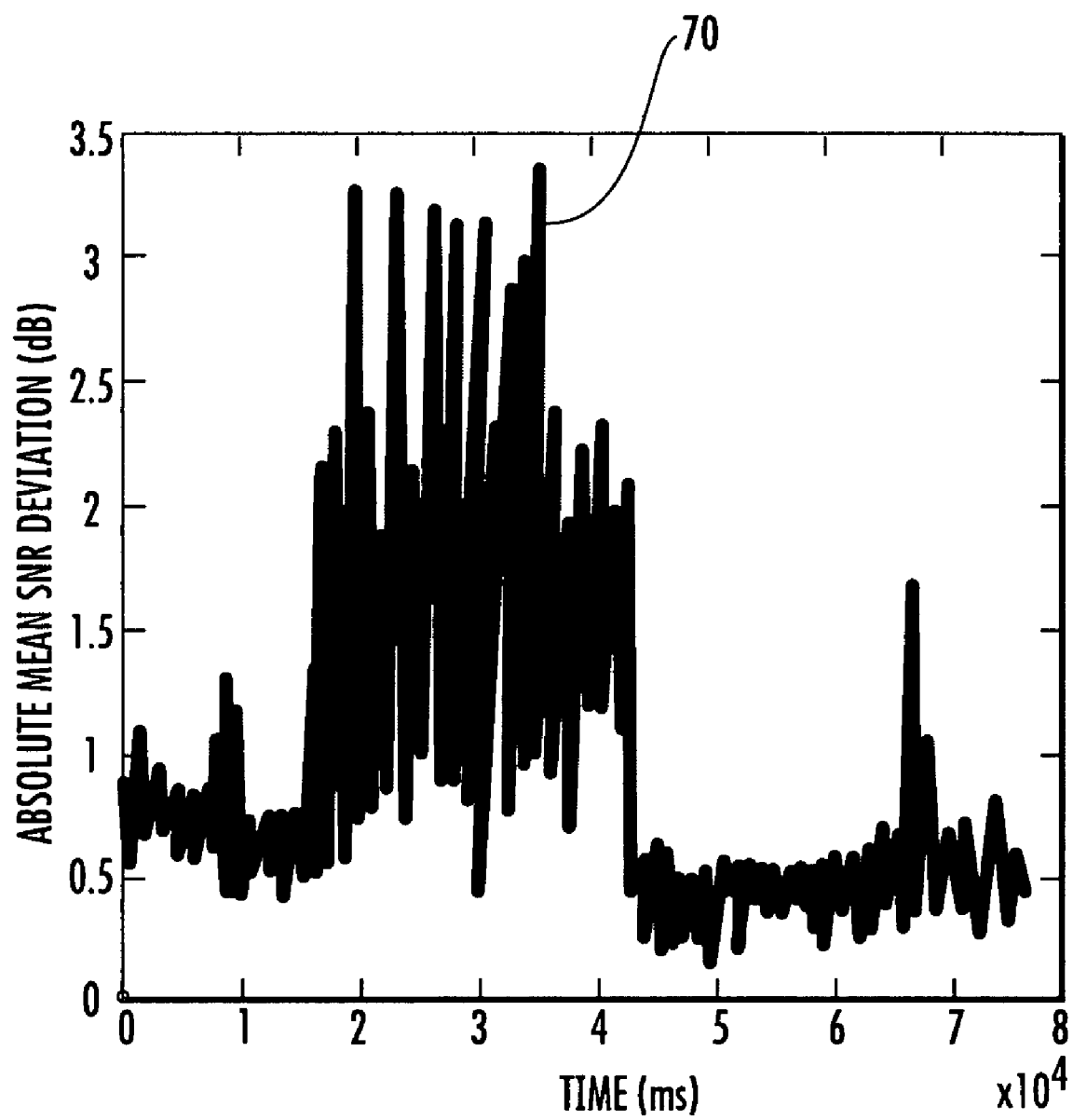
FIG. 9 is a graph of an absolute mean SNR deviation versus time as measured by an access point based upon an acknowledgement signal sent from a client station to the access point while the client station is moving away from the access point in accordance with the present invention.

This threshold does not depend on the SNR values. In the illustrated examples, the threshold remains around 2 to 2.5 dB. This is shown in FIGS. 8 and 9, where the client station 12 was in one position near the access point 14 and walked away from the access point, reducing the mean SNR (line 68), but after the client station stopped, the mean absolute deviation (line 70) dropped to the same region that it was before the movement started, again below the 2 dB threshold.

Measurements were also made on acknowledgements (ACKs) that were more stable than the measurements on data packets (uplink data packets from the client station 12 to the access point 14). This is because acknowledgements are always the same size and usually sent at the same data rate. If data rate affects the SNR values, then SNR of the ACKs is a better metric than SNR of data packets.

Figure 10:
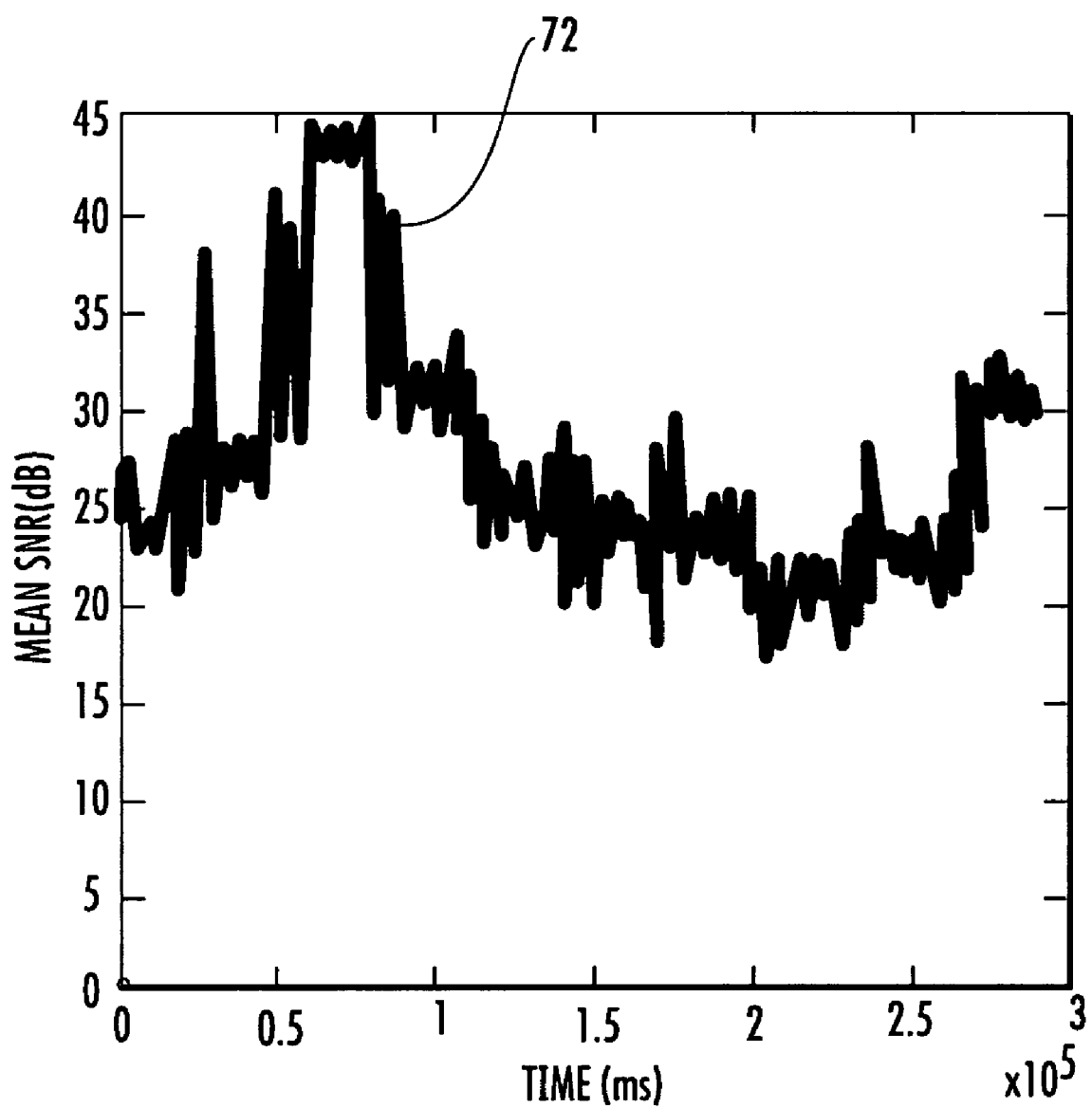
FIG. 10 is a graph of a mean SNR versus time as measured by an access point based upon an acknowledgement signal sent from a client station to the access point while the client station is moving to 10 different locations in accordance with the present invention.
Figure 11:
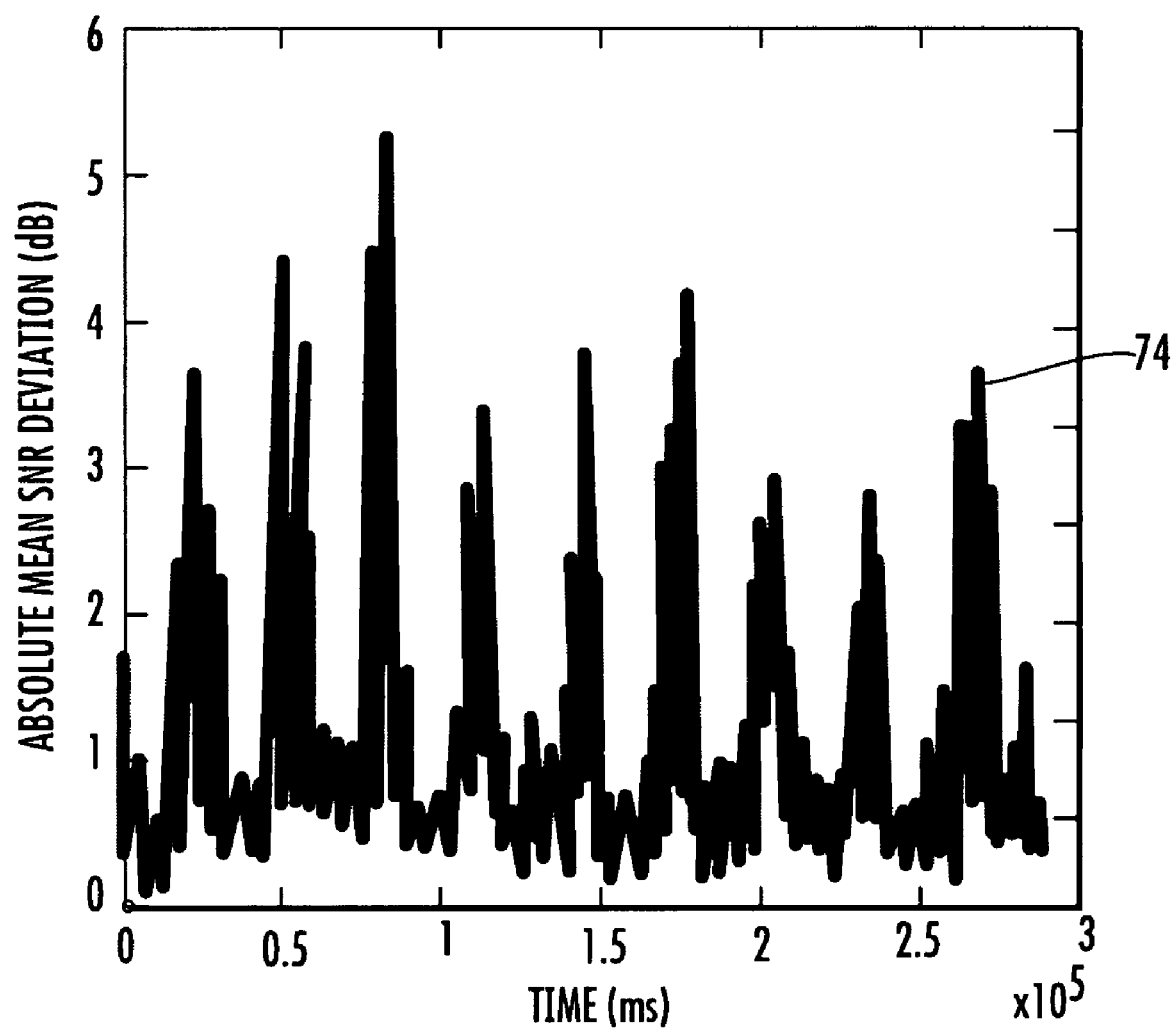
FIG. 11 is a graph of an absolute mean SNR deviation versus time as measured by an access point based upon an acknowledgement signal sent from a client station to the access point while the client station is moving to 10 different locations in accordance with the present invention.

FIGS. 10 and 11 show a scenario where a test using ten locations within the office was performed. The test was performed as follows: the client station 12 is placed in one position and the test starts. The client station 12 remains in that position for a certain period of time, and then is moved to the next position. After arriving to the second position, the client station 12 remains in that position a certain period of time. The procedure continues until the client station 12 reaches the tenth position. During the entire time of this test the client station 12 was downloading a very large file. The access point 14 measures the SNR values (lines 72 and 74) on the 802.11 acknowledgements coming from the client station 12. The mean absolute deviation of the SNR values was calculated over a period of 200 ms. FIGS. 10 and 11 clearly show that the measurement can be easily used to identify the times where the client station 12 was moving. These were the points in time where the measurement was above the certain threshold.

In summary, metrics that reflect the deviation around the mean SNR, such as variance, standard deviation or mean absolute deviation, can be used to identify times where the user is moving. If the given metric stays above a threshold for a long period of time, then that implies that the client station 12 is moving. Moreover, the same threshold can be set for all SNR values and client station 12 positions. This simplifies the implementation of the algorithm. This method also minimizes or reduces overhead because it avoids unnecessary beam scans by identifying when new scans are needed. The threshold can be set around 2 to 2.5 dB, for example. For each different environment, tests should be performed to verify which is the appropriate threshold.

The specifics of the algorithm will now be discussed. To simplify the algorithm, the hold state and omni only state are not needed by the algorithm. This is because the hold state was the state where the SNR was above a threshold, and the omni-directional antenna was used in that case. In that case the access point 14 needed to monitor the SNR while in the hold state to see if it decreases, in which case a scan was triggered.

Also, the access point 14 needed to monitor if there was a decrease in the SNR while in the active state, in which case the client station 12 would be sent to the hold state and the omni-directional antenna would be used. The above-described procedure will catch these changes in the SNR by looking at the mean absolute deviation metric—so the hold state is not needed. A variation in the SNR will trigger the scan and the scan code will then decide if the omni-directional antenna beam 20 is used or not.

The omni only state was when the best beam was omni-directional. This state was treated differently from the active state because there were no directional antenna beam measurements, only omni-directional measurements. With the current algorithm, it does not matter since all measurements are made in the ACK regardless of the beam being used. So, in the above-described procedure the omni-only state is the same as the active state.

There is also no need to calculate the long-term and short term averages, only the mean and the mean absolute deviation over a certain given period of time. For the control algorithm, the metric used is as follows: metric=mean(absolute((SNR−Mean_SNR))).

The algorithm is as follows:

1) perform scanning and choose beam;

2) collect measurements for t_collect, or at least X measurements; and 3) calculate metric for every measurement collected; if the metric is greater than MAX, then monitor the metric for t_1 ms, and a) if the metric is less than MAX for at least t_2 (t_2<t_1) ms, then do nothing and go back to 3); or b) if the metric is above MAX for (t_1−t_2) ms or if t_1 expires, then go to omni and wait until system is stable (remain in omni meanwhile, continue calculating metric); system will be considered stable when the metric is below MAX for at least t_stable; and after stable condition is met, go to step 1 and start over.

Another aspect of the invention is directed to integration of a rate control algorithm 46 and the antenna steering algorithm 18. This is described for an 802.11 access point 14, however, similar ideas apply to any wireless system.

As noted above, the benefits from enhancing the access point 14 with a directional antenna are two-fold: improved throughput to individual stations and the ability to support more users in the network. In most RF environments, the signal level received at the client station 12 can be improved by having the access point 14 transmit using a shaped antenna beam in the direction of the client station. The increased signal level allows the link between the access point 14 and the client station 12 to operate at higher data rates, especially at the outer band of the coverage area.

To use a beam steering method, the antenna steering algorithm 18 needs to decide which beam to use at any given time. The access point 14 serves multiple users in a cell, and these users are located in different positions. The access point 14 needs to be able to discover which beam is the best one to communicate to each user and to use such beam appropriately.

Current approaches use the signal quality measurements performed by the access point 14 in different beams to choose the best beam to be used. In this type of approach, the transmission data rate and the retransmission rates are not taken into consideration. Moreover, to measure different beams, scheduled packets need to be sent from the client station 12 to the access point 14. Thus, "dummy" packets need to be sent in some cases to force the transmission of an ACK from the client station 12, in order to measure the signal quality in different beams. These dummy packets increase the overhead, thus negatively affecting the throughput.

As will be discussed in greater detail below, one approach in accordance with the present invention is to keep separate and independent rate control states for each beam 20, 22 supported by the antenna 16, and select the beam with highest data rate for each downlink packet.

The method applies to any rate control algorithm 46 that is being run in the access point 14, as long as the state of the rate control algorithm is kept separately for each beam. As shown in FIG. 1, the rate control algorithm is within the PHY layer 43. Alternatively, the algorithm 46 may run on the MAC layer 44 instead of the PHY layer 43. The method also uses transmission diversity and it retries a failed packet on a different beam for a better chance to adapt to the environmental change.

Figure 12:
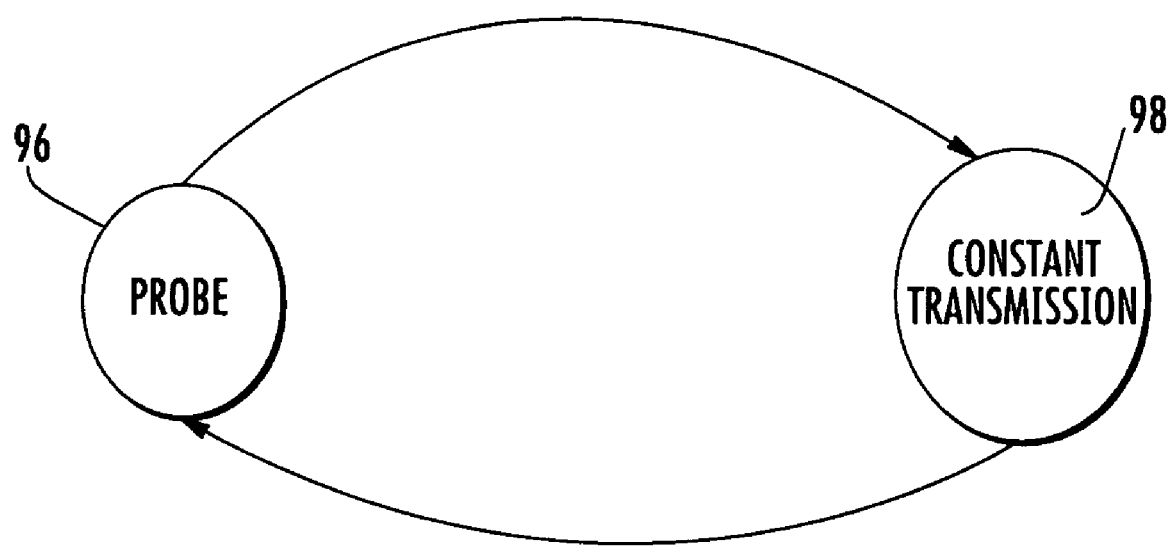
FIG. 12 is a state machine diagram showing the relationship between a probe phase and a constant transmission phase in accordance with the present invention.

Since the access point 14 can only use a subset of beams over a long period, to capture the channel condition changes on other beams, downlink packets will be transmitted on the unused beams periodically to revive the rate control algorithm on these "bad beams" in order to probe the channel condition changes. Also at the time when a client station 12 associated with the access point 14, the access point needs to transmit downlink packets on all beams for a period of time to allow rate control for each beam to converge. This phase is called the "probe phase" 96. The rest of the time when access point 14 selects the beam with best data rate it is called "constant transmission phase" 98. FIG. 12 illustrates a state machine diagram showing the relationship between the probe phase 96 and the constant transmission phase 98.

The following three areas will now be discussed in greater detail: 1) system initialization, 2) probe phase, and 3) constant transmission phase.

In system initialization, a client station 12 associates with the access point 14, and reinitializes rate control parameters for all antenna beams 20 and 22; puts all the antenna beams into a probe set; initializes variable vProbeCnt to MAX_PROBE; initializes variable vProbeRcvCnt to 0; and then enters the probe phase 96.

Figure 13:
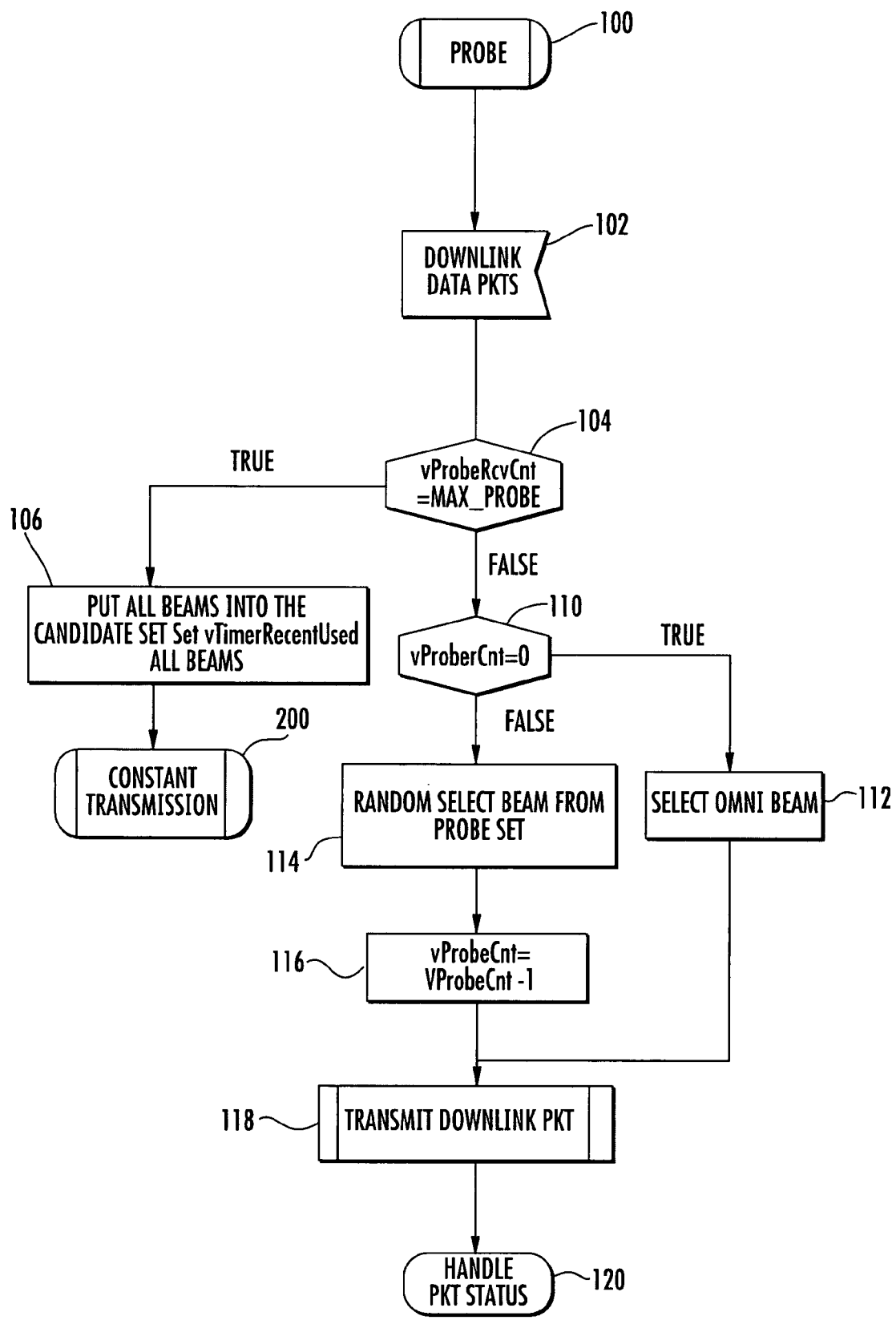
FIG. 13 is a flow diagram illustrating the probe phase for transmitting a data packet in accordance with the present invention.

The probe phase 96 will now be discussed in reference to the flow charts in FIGS. 13 and 14. The downlink data transmission of a data packet from the access point 14 to a client station 12 for an antenna beam 20 or 22 in the probe phase is provided in FIG. 13, whereas the status of the data packet and how the corresponding rate control algorithm 46 is updated in response to the transmitted data packet is provided in FIG. 14.

In the probe phase 100, a set number of data packets will be used, such as 30 for example with a retransmission rate of up to 5 times per selected antenna beam 20, 22. For a downlink data packet 102, a determination is made in block 104 as to whether or not the vProbeRcvCnt=MAX_PROBE. If so, then all the antenna beams 20, 22 have been probed and they are all put into the candidate set in Block 106. Also, the vTimerRecentUsed is set for all the antenna beams 20, 22. At this point, the access point 14 enters the constant transmission phase in Block 200.

If the vProbeRcvCnt<MAX_PROBE in Block 104, then a determination is made in Block 110 as to whether or not the vProbeCnt=0. If the vProbeCnt=0, then the omni-directional antenna beam 22 is chosen in Block 112 for transmitting the downlink data packet in Block 118.

Referring back to Block 110, if the vProbeCnt>0, then a directional antenna beam 20 is randomly selected in Block 114. Instead of a random selection, the directional antenna beam 20 could be picked pick based on a predetermined order, as readily appreciated by those skilled in the art. The vProbeCnt is then decremented by 1 in Block 116. The downlink data packet is then transmitted in Block 118. Regardless of whether the omni-directional antenna beam 22 or a randomly selected directional antenna beam 20 was selected in respective Blocks 112, 114, the handle packet status in Block 120 jumps to the flow chart in FIG. 14.

Figure 14:
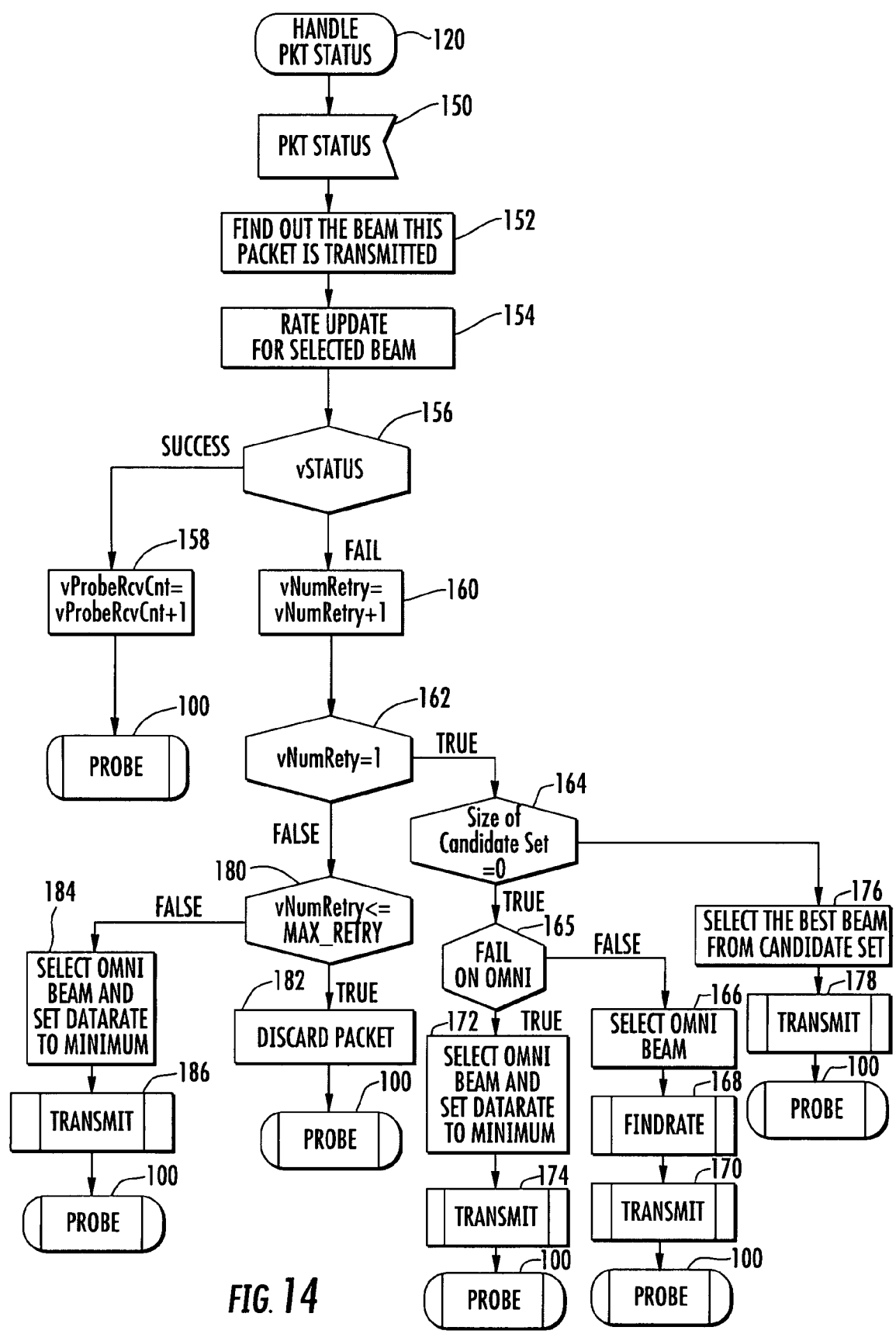
FIG. 14 is a flow diagram illustrating the handle packet status of the data packet transmitted based on the flow chart in FIG. 13.

In the flow chart shown in FIG. 14, the status of the transmitted data packet is determined which has an effect on the current data rate selected for that particular antenna beam. Of particular importance is when transmission of the downlink data packet was not successful. At this point, there are a number of options including retransmission up to a set number of times, such as 5, for example.

Referring now to FIG. 14 in greater detail, the packet status is determined in Block 150. The antenna beam that transmitted the data pack is determined in Block 152. The rate control algorithm 46 associated with the selected antenna beam in Block 152 is adjusted in Block 154. The rate adjustment may be from low to high, or alternatively, from high to low. For 802.11g, the rates are 6, 9, 12, 18, 24, 36, 48 and 54 Mbps. The rate update can thus be done in an ascending or descending order.

The vStatus is determined in Block 156. If the data packet status is successful in Block 150, then the vProbeRcvCnt in Block 158 is incremented by 1. The process then jumps back to the probe phase in Block 100.

However, if the vStatus was not successful in Block 156, then the vNumRetry is incremented 1 in Block 160. The current number for vNumRetry is determined in Block 162. If the vNumRetry>1, then this means there has already been a failure. If the vNumRetry=MAX_RETRY in Block 180, then the data packet is discarded in Block 182 and the process returns back to the probe phase in Block 100. If the vNumRetry<MAX_RETRY in Block 180, then the omni-directional antenna beam 22 is selected in Block 184. The data rate is set to the minimum so that when the data packet is retransmitted in Block 186 it will be successful. The process then jumps back to the probe phase in Block 100.

Returning back to Block 162, if vNumRetry=1, which means this is the first failure, then a determination is made in Block 164 for the size of the candidate set of the probe antennas. If the size of the candidate set is set to 0, then this means that all of the directional antenna beams 20 are bad, and a determination is made in Block 165 if there was a previous failure using the omni-directional antenna beam 22.

If there was a previous failure using the omni-directional antenna beam 22, then it is still selected in Block 172 and the data rate is set to the minimum so that when the data packet is retransmitted in Block 174 it will be successful. The process then jumps back to the probe phase in Block 100.

If there was not a previous failure using the omni-directional antenna beam 22, then it is still selected in Block 166 but the data rate is determined in Block 168. The data packet is retransmitted in Block 170, and the process then jumps back to the probe phase in Block 100.

Returning back to Block 164, if the size of the candidate set of the probe antennas is greater than 0, then the best antenna beam is selected from the candidate set of antenna beams in Block 176. The data packet is retransmitted in Block 178, and the process then jumps back to the probe phase in Block 100.

When back at the probe phase in Block 100, the process continues until all of the antenna beams 20, 22 have been probed. Each time a selected antenna is probed based on the flow chart in FIG. 13, the process jumps to the flow chart in FIG. 14 for determining a status of the transmitted data packet.

A result of the probe phase 96 is that a candidate set of antenna beams is formed. For each antenna beam in the candidate set, the respective rate control algorithm 46 is set at a particular data rate.

Figure 15:
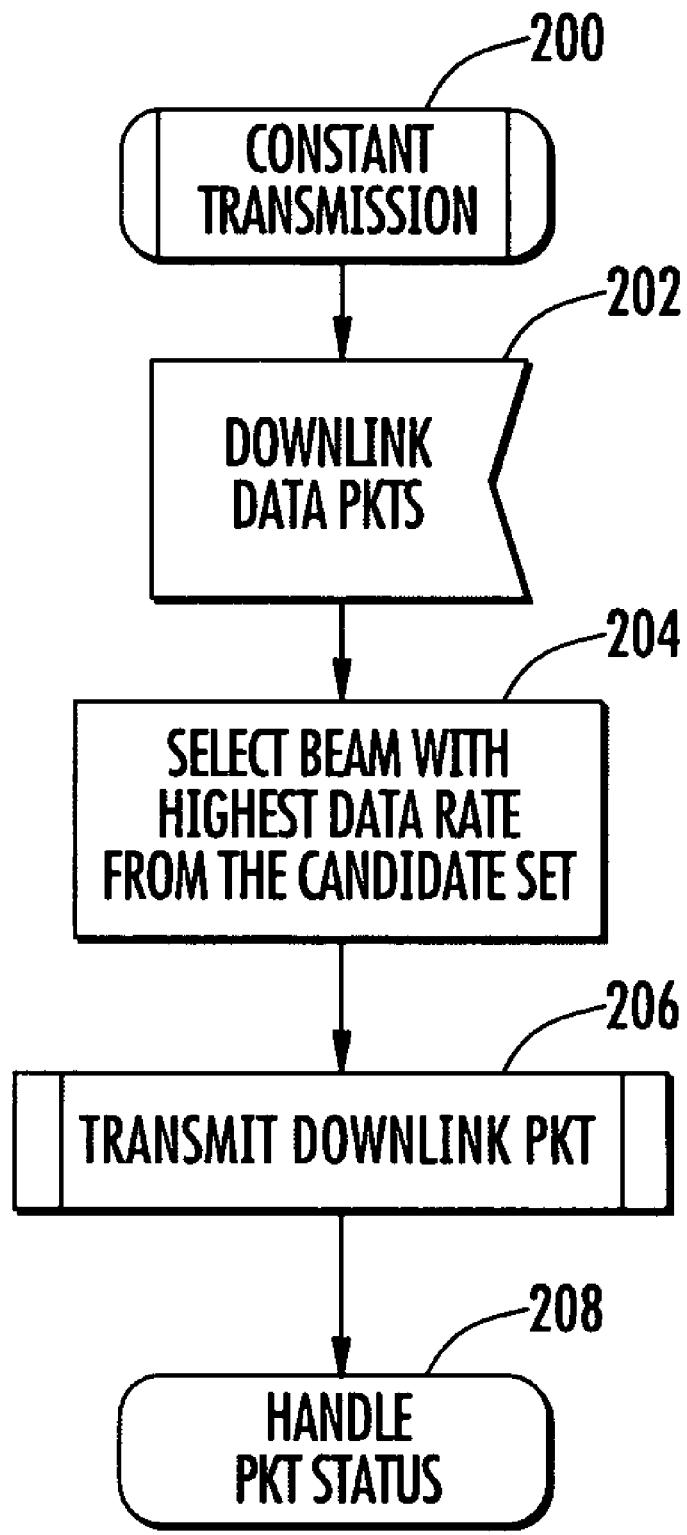
FIG. 15 is a flow diagram illustrating the constant transmission phase for transmitting a data packet in accordance with the present invention.

After the probe phase 96 has ended, the antenna access point 14 enters the constant transmission phase 98. The constant transmission phase 98 will now be discussed in reference to the flow charts FIGS. 15 and 16.

Figure 16:
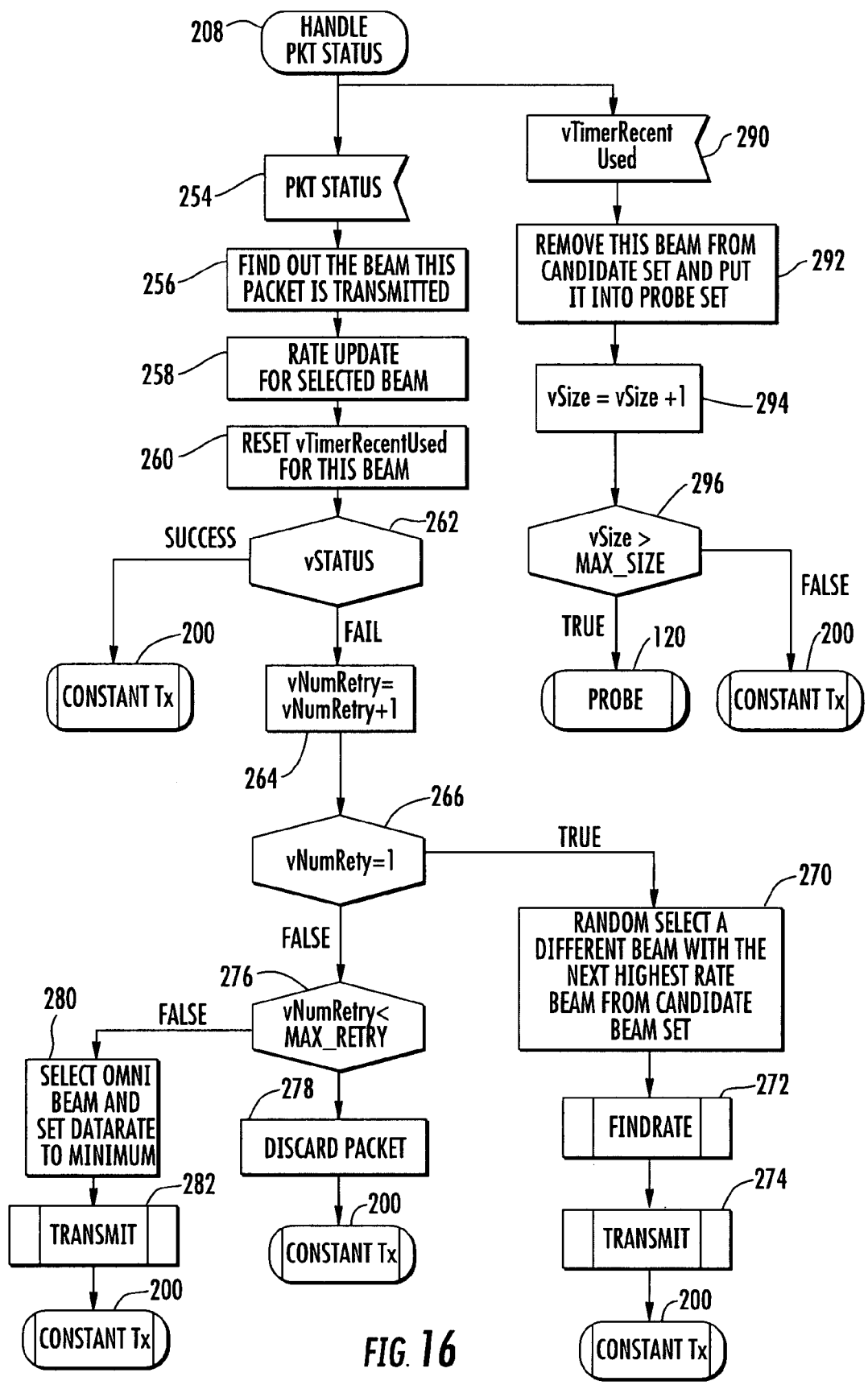
FIG. 16 is a flow diagram illustrating the handle packet status of the data packet transmitted based on the flow chart in FIG. 15.

From the constant transmission phase in Block 200, the downlink data packets are selected for transmission in Block 202. The access point 14 selects the antenna beam with the highest data rate from the candidate set in Block 204. The data packet is then transmitted in Block 206. The handle packet status in Block 208 jumps to the flow chart in FIG. 16. The flow chart in FIG. 16 is similar to the flow chart in FIG. 14.

The packet status is determined in Block 254. The antenna beam that transmitted the data pack is determined in Block 256. The rate control algorithm 46 associated with the selected antenna beam in Block 256 is adjusted in Block 258. As discussed above, the rate adjustment may be from low to high, or alternatively, from high to low. The rate update can thus be done in an ascending or descending order.

The vStatus is determined in Block 262. If the data packet status is successful in Block 254, then the process returns to the constant transmission phase in Block 200.

However, if the vStatus is not successful in Block 262, then the vNumRetry is incremented 1 in Block 264. The current number for vNumRetry is determined in Block 266. If the vNumRetry>1, then this means there has already been a failure. If the vNumRetry=MAX_RETRY, then the data packet is discarded in Block 278 and the process returns back to the constant transmission phase in Block 200. If the vNumRetry<MAX_RETRY in Block 276, then the omni-directional antenna beam 22 is selected in Block 280. The data rate is set to the minimum so that when the data packet is retransmitted in Block 282 it will be successful. The process then jumps back to the constant transmission phase in Block 200.

Returning back to Block 266, if vNumRetry=1, which means this is the first failure, then the access point 14 randomly selects a different antenna beam with the next highest rate beam from the candidate set in Block 270. The data rate is determined in Block 272, and the data packet is retransmitted in Block 274. The process then jumps back to the constant transmission phase in Block 200.

To determine when to switch back to the probe phase 96, a determination is made as to whether or not the timer vTimerRecentUsed has expired in Block 290. If yes, then the current antenna beam is removed from the candidate set and placed in the probe set in Block 292. The variable vSize is increased by 1 in Block 294. If the vSize>MAX_SIZE in Block 296, then the process returns back to the probe phase in Block 120 and as shown in FIG. 12. If the vSize<MAX_SIZE in Block 296, then the process returns back to the constant transmission phase in Block 200.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed is:

1. A method for operating an access point in an 802.11 wireless communication network communicating with at least one client station, the access point comprising a smart antenna for generating a plurality of directional antenna beams, the method comprising:
   communicating with a client station using a selected directional antenna beam, with the client station initially being in a stationary position;
   measuring signal to noise ratios of signals received from the client station within a time interval;
   determining at least one variation metric of a mean of the measured signal to noise ratios within the time interval; and
   determining if the client station is moving by comparing the at least one determined variation metric to a threshold.

2. A method according to claim 1 wherein the smart antenna further generates an omni-directional antenna beam; and wherein the at least one determined variation metric comprises a plurality of determined variation metrics, and if the plurality of determined variation metrics is greater than the threshold over a second time interval, then the omni-directional antenna beam is selected indicating that the client station is moving.

3. A method according to claim 2 wherein if the plurality of determined variation metrics is greater than the threshold but less than the second time interval, then the selected directional antenna beam remains unchanged.

4. A method according to claim 1 further comprising scanning the plurality of directional antenna beams if the client station has moved to a new stationary position.

5. A method according to claim 1 wherein the at least one variation metric is based on a mean absolute value of the measured signal to noise ratios, with the absolute value being taken of a measured signal to noise ratio less the mean of the measured signal to noise ratios within the time interval.

6. A method according to claim 1 wherein the at least one variation metric is based on a standard deviation of the measured signal to noise ratios.

7. A method according to claim 1 wherein the at least one variation metric is based on a variance of the measured signal to noise ratios.

8. A method according to claim 1 wherein the threshold is independent of the measured signal to noise ratios.

9. A method according to claim 1 wherein the signals being measured from the client station comprise acknowledgment messages.

10. A method according to claim 1 wherein the signals being measured from the client station comprise data packets.

11. A method for operating an access point in a wireless communication network communicating with at least one client station, the access point comprising a smart antenna for generating a plurality of directional antenna beams and an omni-directional antenna beam, the method comprising:
    communicating with a client station using a selected directional antenna beam, with the client station initially being in a stationary position;
    measuring signal to noise ratios of signals received from the client station within a time interval;
    determining a plurality of variation metrics of a mean of the measured signal to noise ratios within the time interval; and
    comparing the plurality of determined variation metrics to a threshold for determining if the client station is moving, and if the plurality of determined variation metrics exceed the threshold for a second time interval, then selecting the omni-directional antenna beam.

12. A method according to claim 11 wherein if the plurality of determined variation metrics is greater than the threshold but less than the second time interval, then the selected directional antenna beam remains unchanged.

13. A method according to claim 11 further comprising repeating the measuring and determining for subsequent time intervals for determining if the client station has stopped moving, and if so, then scanning the plurality of directional antenna beams.

14. A method according to claim 11 wherein each variation metric is based on a mean absolute value of the measured signal to noise ratios, with the absolute value being taken of a measured signal to noise ratio less the mean of the measured signal to noise ratios within the time interval.

15. A method according to claim 11 wherein each variation metric is based on a standard deviation of the measured signal to noise ratios.

16. A method according to claim 11 wherein each variation metric is based on a variance of the measured signal to noise ratios.

17. A method according to claim 11 wherein the threshold is independent of the measured signal to noise ratios.

18. A method according to claim 11 wherein the signals being measured from the client station comprise acknowledgments messages.

19. An access point for operating in an a wireless communication network, and comprising:
   a smart antenna for generating a plurality of directional antenna beams;
   a transceiver coupled to said smart antenna for communicating with a client station using a selected directional antenna beam, and comprising a measurement unit for measuring signal to noise ratios of signals received from the client station, with the client station initially being in a stationary position; and
   a processor coupled to said transceiver for performing the following
      measuring signal to noise ratios of the signals received from the client station within a time interval,
      determining at least one variation metric of a mean of the measured signal to noise ratios within the time interval, and
      determining if the client station is moving by comparing the at least one determined variation metric to a threshold.

20. An access point according to claim 19 wherein said smart antenna further generates an omni-directional antenna beam; and wherein the at least one determined variation metric comprises a plurality of determined variation metrics, and if the plurality of determined variation metrics is greater than the threshold for a second time interval, then the omni-directional antenna beam is selected.

21. An access point according to claim 20 wherein if the plurality of determined variation metrics is greater than the threshold but less than the second time interval, then the selected directional antenna beam remains unchanged.

22. An access point according to claim 19 wherein said processor initiates scanning of the plurality of directional antenna beams if the client station has moved to a new stationary position.

23. An access point according to claim 19 wherein the at least one variation metric is based on a mean absolute value of the measured signal to noise ratios, with the absolute value being taken of a measured signal to noise ratio less the mean of the measured signal to noise ratios within the time interval.

24. An access point according to claim 19 wherein the at least one variation metric is based on a standard deviation of the measured signal to noise ratios.

25. An access point according to claim 19 wherein the at least one variation metric is based on a variance of the measured signal to noise ratios.

26. An access point according to claim 19 wherein the threshold is independent of the measured signal to noise ratios.

27. An access point according to claim 19 wherein the signals being measured by said measurement unit comprise acknowledgment messages.

28. An access point according to claim 19 wherein the signals being measured by said measurement unit comprise data packets.

* * * * *